UNITED STATES PATENT OFFICE.

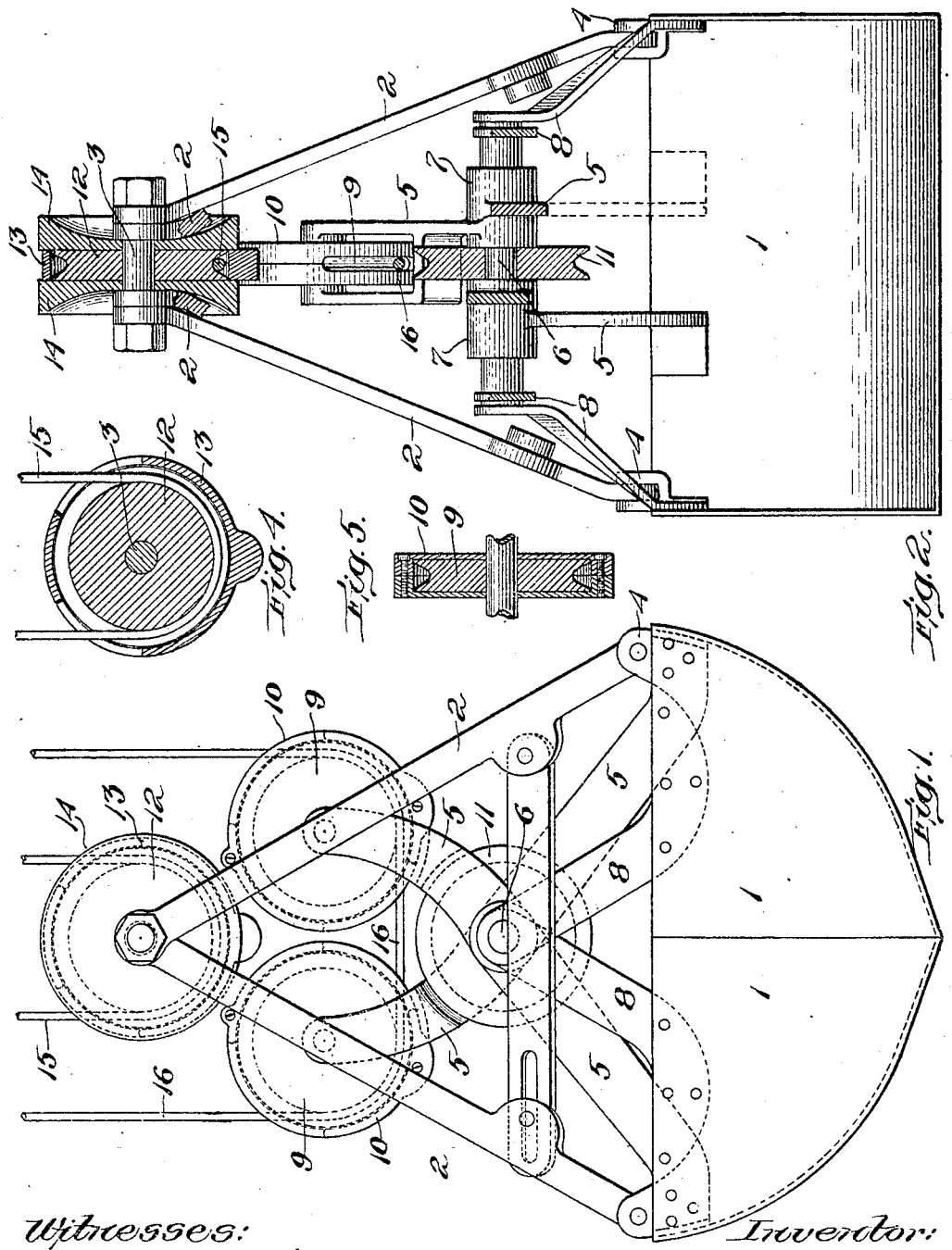

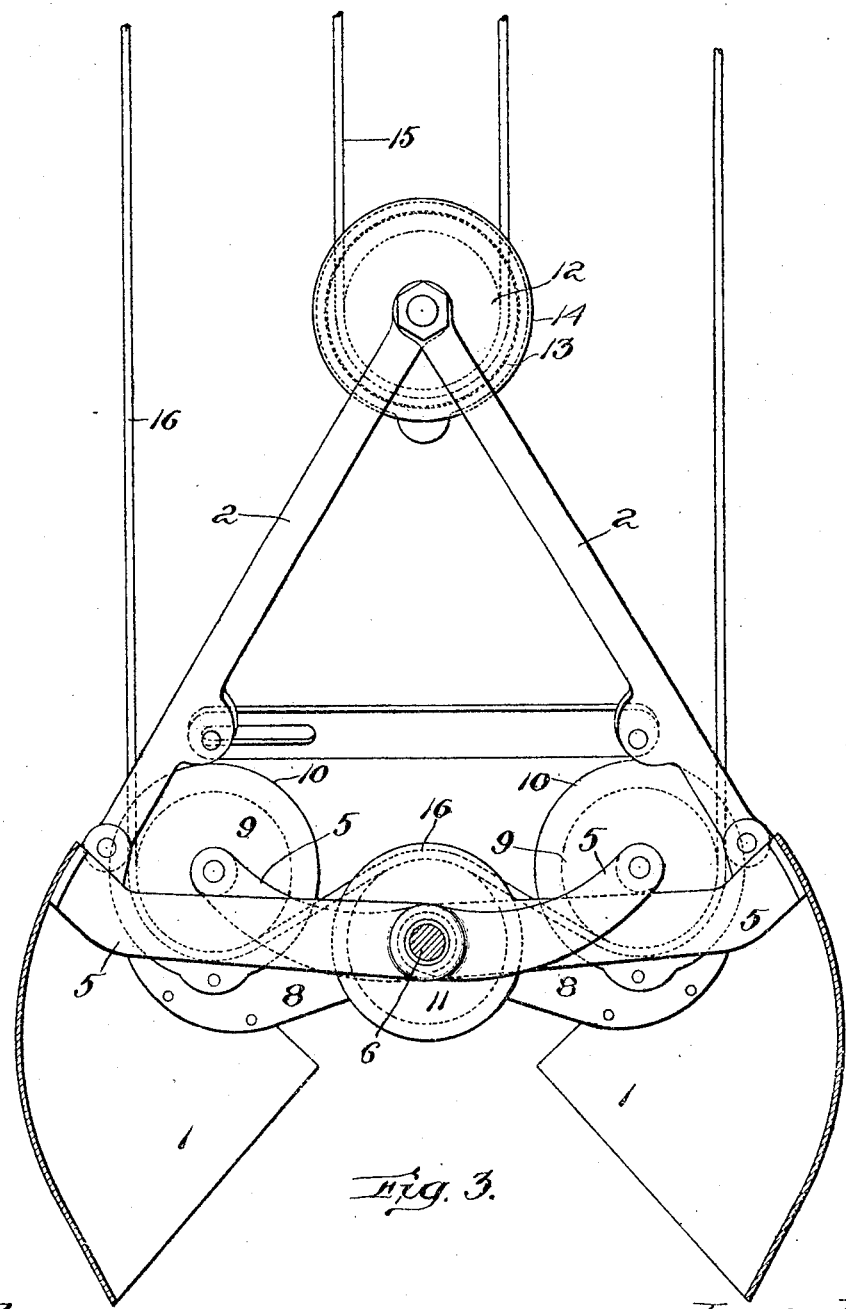

ARCHIBALD G. MONKS, OF BROOKLINE, MASSACHUSETTS.

GRAB.

No. 856,413. Specification of Letters Patent. Patented June 11, 1907.

Application filed November 2, 1906. Serial No. 341,676.

*To all whom it may concern:*

Be it known that I, ARCHIBALD G. MONKS, a citizen of the United States, and a resident of Brookline, in the county of Norfolk and State of Massachusetts, have invented new and useful Improvements in Grabs, of which the following is a specification.

My invention relates to grabs or hoisting buckets, and its principal objects are to provide a grab or bucket in which the parts shall not be subjected to any lateral strain or twist when the power is applied to the holding and the closing falls; to organize and arrange the closing sheaves and fall so that the lines of force shall be distributed and directed to the best advantage when the closing fall is operated; and to improve the construction of the top head of the grab in such a way as to protect the holding fall from injury, and otherwise to improve the balance and strength of the top head and the parts depending therefrom. Other features will be hereinafter described.

In the accompanying drawings which illustrate one embodiment of my invention, Figure 1 is a side elevation of a grab containing my invention, the shells of the grab being in closed position; Fig. 2 is a vertical section of said grab through the middle of Fig. 1, some of the parts being shown in elevation; Fig. 3 is a side elevation of the grab shown in Fig. 1, the shells being in open position; Fig. 4 is a detail showing in vertical longitudinal section the holding sheave, holding fall and keeper; and Fig. 5 is a detail showing in vertical cross section one of the closing sheaves and its keeper.

The same parts are indicated by like reference numerals in all of the figures.

Referring to the drawings, 1, 1 represent the pair of separable sections or shells of the grab. Pivotally connected with the outer corners of each shell 1, 1 are the supporting arms 2, 2 which converge toward their tops as shown and are pivoted at the top upon the top head shaft 3. The arms 2 are pivotally attached to the shells 1, 1 by any suitable means, as by the forked lugs 4, 4. Rigidly secured to the shells 1, 1 are the forked closing levers 5, 5 which extend upward from the shells of the grab at acute angles and are journaled upon the shaft 6, at which point the lever 5 of one shell crosses the lever 5 of the other shell as shown, the hubs 7, 7 furnishing suitable bearings. Additional arms or braces 8, 8 are provided, also journaled upon shaft 6 as shown. At the upper ends of lever arms 5, 5 the closing sheaves 9, 9 are journaled; these sheaves are preferably inclosed in keepers 10 to prevent the closing cable or fall from coming out of engagement with the sheaves. Midway between the closing levers 5, 5 is journaled the sheave 11, the purpose and operation of which will presently be described.

The top head of the grab comprises the top head shaft 3 (from which depend the shells of the bucket and the operating parts all supported by the arms 2, 2), the holding sheave 12 mounted on the top head shaft 3, the keeper 13, and a guard projecting above sheave 12 to act as a buffer to prevent the sheave 12 from injury when the grab is hoisted up to the boom or trolley from which the grab is suspended. This guard preferably consists of a pair of disks 14, 14 mounted to rotate idly on the top head shaft 3, one on either side of the holding sheave 12.

The holding fall 15 passes under sheave 12 and is secured to the trolley or boom above, with provision for lengthening or shortening it to lower or raise the grab, all in any well known manner. The closing fall 16 passes under the two closing sheaves 9, 9 and above the sheave 11. The closing fall also is secured to the boom or trolley with provision for operating it in any well known manner. Both the holding and the closing falls may be cables or chains as desired.

The operation of the device is as follows: In the position shown in Fig. 1 in which the shells of the grab are closed, the closing fall 16 is taut, tending to pull the closing sheaves upward and together and thus to hold the shells together. When the tension on the closing fall is slackened the grab will open by gravity, the weight of the shells, the closing levers and other parts tending to spread the two sections apart. Fig. 3 shows the grab in open position. It will be observed that when the grab is closed the closing fall 16 is out of contact with the sheave 11. As the grab opens, however, and the closing sheaves swing downward and apart, the closing fall engages the top of sheave 11, and the continued opening movement causes the stretch of the fall 16 between the sheaves 9 and 9 to assume the position shown in Fig. 3. When the closing fall 16 is again pulled taut to close the grab, not only do the vertical stretches of the fall exert forces tending to pull the closing sheaves upward and together and thus to close the shells together, but the tendency of the stretch of fall 16 between sheaves 9, 9 is to straighten out under tension, thus forcing sheave 11 and its axis, which is also the axis of the closing levers, downward at the same time the sheaves 9, 9 are forced upward, whereby the closing power of the grab is greatly increased over that of grabs heretofore used lacking the sheave 11. It will also be observed that all of the sheaves 9, 9 11 and 12 are in the same plane, or in alinement. In other hoisting buckets so far as I am aware, the hoisting sheave and the closing sheaves have not been in the same plane but have been offset, one with relation to the other, with the result that the supporting bars 2, 2 the top head shaft 3, and other parts of the grab have been subjected to a lateral strain or twist and have frequently broken. This tendency is avoided in the improved grab above described, and the strength and durability of the device is consequently increased.

While other forms of guards in the top head than the disks 14, 14 may be employed and are within the scope of my invention, I believe that the form above described possesses advantages not possessed by other forms. By having the guard pieces rotatably mounted on the top head shaft 3 instead of rigidly secured, they will immediately roll into their proper position when the grab is hoisted up into contact with the trolley or boom whether it be hoisted vertically, in a straight line, or swinging. Moreover, even when the guards are rigidly held against the trolley or boom, they will permit the grab to swing freely. The guard disks 14, 14 may be mounted to rotate idly upon the top head shaft as shown in the drawings, or they may, if desired, be bolted or otherwise secured to the holding sheave. Either form is within the scope of my invention and is contemplated by the claims.

I claim:

1. A grab comprising the pair of separable shells, a pair of closing levers crossed and pivotally connected together, each secured at its lower end to one of the shells and provided at its upper end with a closing sheave, a sheave mounted at the axis of the closing levers, and a closing fall passing under the closing sheaves and above the sheave at the axis of the levers.

2. A grab comprising a pair of separable shells, a holding sheave, supporting arms connecting the holding sheave and the shells, a pair of closing levers crossed and pivotally connected together, each secured at its lower end to one of the shells and provided at its upper end with a closing sheave, and a closing fall passing under the closing sheaves, all of said sheaves being in the same plane.

3. A grab comprising a pair of separable shells, a holding sheave, supporting arms connecting the holding sheave and the shells, a pair of closing levers crossed and pivotally connected together, each secured at its lower end to one of the shells and provided at its upper end with a closing sheave, a sheave mounted at the axis of the closing levers, and a closing fall passing under the closing sheaves and above the sheave at the axis of the levers, all of said sheaves being in the same plane.

4. A grab comprising a pair of separable shells, a holding sheave, supporting arms between the axis of the holding sheave and the outer corners of the shells, a pair of closing levers crossed and pivotally connected together, each secured at its lower end to one of the shells and provided at its upper end with a closing sheave, and a closing fall passing under the closing sheaves, all of said sheaves being in the same plane.

5. A grab comprising a pair of separable shells, a holding sheave, supporting arms connecting the holding sheave and the shells, a pair of closing levers crossed and pivotally connected together, each secured at its lower end to one of the shells, and provided at its upper end with a closing sheave, a sheave mounted at the axis of the operating levers, and a closing fall passing under the closing sheaves and above the sheave at the axis of levers, the parts being organized and arranged so that the closing fall between the closing sheaves will not be deflected by the sheave at the axis of the levers when the grab is closed, but will be deflected thereby when the grab is open.

6. In a grab, a top head comprising a top head shaft, supporting arms pivotally connected therewith, a holding sheave mounted on the top head shaft and a guard upon said top head shaft projecting above the sheave and adapted to act as a buffer when the grab is hoisted.

7. In a grab, a top head comprising a top head shaft, supporting arms pivotally connected therewith, a holding sheave mounted on the top head shaft, and a guard rotatably mounted upon said top head shaft, projecting above the sheave, and adapted to act as a buffer when the grab is hoisted.

8. In a grab, a top head comprising a top head shaft, supporting arms pivotally connected therewith, a holding sheave mounted on the top head shaft, and a guard consisting of a pair of disks, one mounted on either side of the sheave, and having a greater diameter than the sheave.

9. A grab comprising a pair of separable shells, a holding sheave, supporting arms between the axis of the holding sheave and the outer corners of the shells, a pair of forked closing levers crossed and pivotally connected together, each rigidly secured at its lower end to one of the shells and provided at its upper end with a closing sheave, a sheave mounted at the axis of the closing levers, a closing fall passing under the closing sheaves and above the sheave at the axis of the levers, all of said sheaves being in the same plane, and a pair of guard disks rotatably mounted one on either side of the holding sheave, substantially as described.

Signed by me at Boston, Massachusetts, this twenty ninth day of October, 1906.

ARCHIBALD G. MONKS.

Witnesses:
   ODIN ROBERTS,
   B. DEVEREUX BARKER.